United States Patent
Smith et al.

(10) Patent No.: US 6,765,745 B2
(45) Date of Patent: Jul. 20, 2004

(54) METHOD AND APPARATUS FOR IN SITU DETECTION OF HIGH-FLYING SLIDERS OVER CUSTOMER DATA

(75) Inventors: Gordon James Smith, Rochester, MN (US); Hal Hjalmar Ottesen, Rochester, MN (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 327 days.

(21) Appl. No.: 10/034,798

(22) Filed: Dec. 28, 2001

(65) Prior Publication Data

US 2003/0123171 A1 Jul. 3, 2003

(51) Int. Cl.$^7$ .............................................. G11B 21/02
(52) U.S. Cl. ........................................................ 360/75
(58) Field of Search ......................... 360/75, 25, 31, 360/77.02

(56) References Cited

U.S. PATENT DOCUMENTS

| | | | | |
|---|---|---|---|---|
| 5,604,690 A | * | 2/1997 | Bellanger | 708/276 |
| 5,831,781 A | * | 11/1998 | Okamura | 360/31 |
| 5,909,330 A | * | 6/1999 | Carlson et al. | 360/31 |
| 6,188,979 B1 | * | 2/2001 | Ashley | 704/205 |
| 6,191,901 B1 | * | 2/2001 | Carlson et al. | 360/31 |
| 6,229,665 B1 | * | 5/2001 | Carlson et al. | 360/75 |
| 6,268,976 B1 | * | 7/2001 | Carlson et al. | 360/75 |
| 6,275,029 B1 | * | 8/2001 | Schaff | 324/212 |
| 6,404,504 B2 | * | 6/2002 | Liu et al. | 356/507 |
| 6,411,458 B1 | * | 6/2002 | Billings et al. | 360/75 |
| 6,459,539 B1 | * | 10/2002 | Carlson et al. | 360/31 |

* cited by examiner

Primary Examiner—David Hudspeth
Assistant Examiner—Fred F. Tzeng
(74) Attorney, Agent, or Firm—Joan Pennington

(57) ABSTRACT

A method and apparatus are provided for in situ detection of high-flying sliders over customer data. A sampled and digitized readback sequence x(n) from a logical data block of customer data is received. Bandpass filtered data of the readback sequence x(n) is generated and processed for generating a predefined harmonic ratio. The generated predefined harmonic ratio is compared with a predefined threshold value to identify a high-flying slider. Bandpass filtered data of the readback sequence x(n) is generated with a digital comb filter and a digital resonator. The bandpass filtered data of the readback sequence x(n) is either squared or the absolute value is taken for a predefined number of samples and then accumulatively summed for the predefined number of samples and the harmonic ratio is calculated. The generated predefined harmonic ratio is compared with a predefined threshold value that is determined as a function of head and disk parameters. During a read operation, an equalizer high-frequency boost is generated responsive to identifying a high-flying slider. During a write operation to a selected write location, the write operation is aborted responsive to identifying a high-flying slider near the selected write location.

19 Claims, 8 Drawing Sheets

| S | LDB(k-2) | LDB(k-1) | LDB(k) | LDB(k+1) | S | LDB(k+2) | LDB(k+3) |

FIG. 5A

| S | LDB(k-2) | LDB(k-1) | L | S | L | LDB(k+1) | LDB(k+2) | L | S |

FIG. 5B

METHOD AND APPARATUS FOR IN SITU DETECTION OF HIGH-FLYING SLIDERS OVER CUSTOMER DATA

FIELD OF THE INVENTION

The present invention relates generally to the data processing field, and more particularly, relates to a method and apparatus for in situ detection of high-flying sliders over customer data in a direct access storage device (DASD).

DESCRIPTION OF THE RELATED ART

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads mounted on air bearing sliders, are driven in a path toward and away from the drive axis, write data to the disks and read data from the disks.

In disk drives or direct access storage devices (DASDs), the continuing increases in data storing capacities are accomplished by increasing linear recording densities and track densities. To provide an adequate signal-to-noise ratio (SNR) of the readback signal, the nominal head to disk spacing is reduced. This decreased head to disk spacing can significantly increase the occurrences of head to disk interactions and the probability of a terminal head crash. To minimize the effects of head to disk interaction and to increase the reliability of the disk drive, surface lubricant is used.

At times during normal disk-drive operation, temporary increased head-to-disk spacing is caused, for example, by excessive buildup of disk surface lubricant at random locations on the head and disc surfaces. An excessive amount of lubricant causes a temporary increase in head-to-disk spacing and can result in data errors. A high-flying slider carrying the transducer heads often causes data errors due to increased attenuation of the high-frequency components both in the recorded or written signal and in the readback signal.

Transducer heads or read/write heads typically include a thin film inductive head or write head for writing data and a magnetoresistive (MR) head or read head for reading data. The customer data is written or recorded on the disk as variable-length regions of alternating magnetized media, for example, alternating north-south magnetization. Thus, the readback signal would ideally resemble a variable frequency square wave signal which is very rich in harmonic frequencies. Both the MR read head and thin-film inductive write head are subject to head-to-disk spacing attenuation or loss. The head-to-disk normalized spacing-loss $Q(f_1)$ is a negative exponential function of the head-to-disk spacing (d). The well known Wallace's equation gives the spacing loss equation $Q(f_1)$ for a spatial frequency $f_1$ as:

$$Q(f_1)=\exp(-2*\pi*d/lam_1) \qquad \text{Equation (1)}$$

where d is the head-to-disk spacing (meters) and $lam_1=1/f_1$ is the spatial wavelength (meters) of the spatial frequency $f_i$. The spatial wavelength can be found from the relation:

$$lam_1=\pi*r*RPM/30*f_1 \qquad \text{Equation (2)}$$

where r is the track radius, RPM is the spindle velocity, and $f_1$ is the recording frequency (Hz).

If we designate $f_1$ as an all ones recording frequency or a (1 0 1 0 1 0 1 . . . ) frequency and its third harmonic frequency as $f_3=3*f_1$, then the ratio R of the normalized spacing loss at $f_1$ and $f_3$ can be found from Equation (1) to be equal to:

$$R=Q(f_1)/Q(f_3)=\exp(4*\pi*d/lam_1) \qquad \text{Equation (3)}$$

Various flyheight estimation techniques are known that employ Equation (1) and Equation (3). For example, solving Equation (1) for the flyheight separation d provides the basis for a known clearance modulation detection (CMD) method, and solving Equation (3) for the flyheight separation d provides the basis for another harmonic ratio flyheight (HRF) method. Both the CMD method and HRF method have proved very valuable in the detection and estimation of flyheight variation. The main problem with these methods is that they require a readback signal with a single frequency to function. Thus, the prior art methods do not work when flying over customer data where the readback produced is a frequency modulated signal. At the present time, there are no known in situ methods for monitoring the flyheight of a slider while reading customer data.

A need exists for a method and apparatus for in situ detection of high-flying sliders over customer data. It is desirable to provide such method and apparatus for in situ detection of high-flying sliders while the slider is reading and writing customer data.

SUMMARY OF THE INVENTION

A principal object of the present invention is to provide a method and apparatus for in situ detection of high-flying sliders over customer data. Other important objects of the present invention are to provide such method and apparatus for in situ detection of high-flying sliders over customer data substantially without negative effect and that overcome some disadvantages of prior art arrangements.

In brief, a method and apparatus are provided for in situ detection of high-flying sliders over customer data. A sampled and digitized readback sequence x(n) from a logical data block of customer data is received. Bandpass filtered data of the readback sequence x(n) is generated and processed for generating a predefined harmonic ratio. The generated predefined harmonic ratio is compared with a predefined threshold value to identify a high-flying slider.

In accordance with features of the invention, bandpass filtered data of the readback sequence x(n) is generated with a digital comb filter and a digital resonator. The bandpass filtered data of the readback sequence x(n) is either squared or the absolute value is taken for a predefined number of samples and then accumulatively summed for the predefined number of samples and the harmonic ratio is calculated. The generated predefined harmonic ratio is compared with a predefined threshold value that is determined as a function of head and disk parameters. During a read operation, a high-frequency boost is applied by using a read channel equalizer responsive to identifying a high-flying slider. During a write operation to a selected write location, the write operation is aborted responsive to identifying a high-flying slider near the selected write location.

BRIEF DESCRIPTION OF THE DRAWINGS

The present invention together with the above and other objects and advantages may best be understood from the following detailed description of the preferred embodiments of the invention illustrated in the drawings, wherein:

FIGS. 5A and 5B respectively illustrate examples of two different arrangements of logical data block (LDB) sectors and servo sectors S for an outer diameter (OD) track and for an inner diameter (ID) track;

DETAILED DESCRIPTION OF THE PREFERRED EMBODIMENTS

Figure 1:
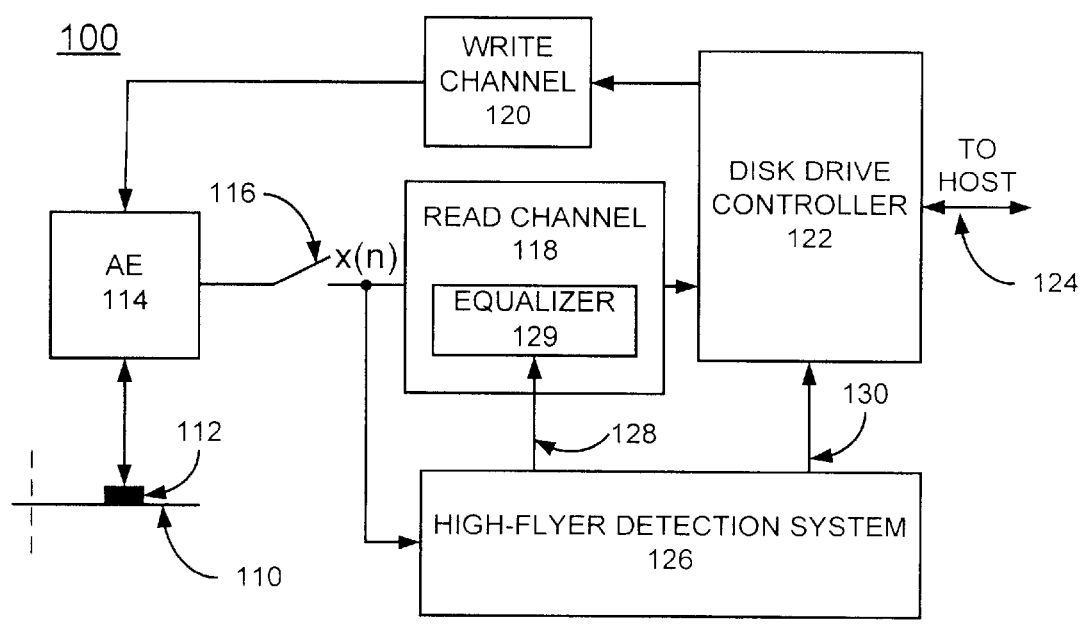
FIG. 1 is a block diagram representation illustrating a direct access storage device (DASD) for implementing methods for in situ detection of high-flying sliders over customer data in accordance with the preferred embodiment.

Having reference now to the drawings, in FIG. 1, there is shown a direct access storage device (DASD) or disk drive system for implementing methods for in situ detection of high-flying sliders over customer data of the preferred embodiment generally designated by the reference character 100. As shown in FIG. 1, DASD 100 includes a recorded disk 110 that is spun at constant speed and that is magnetically coated on both surfaces. Reference character 112 generally designates an assembly of a read/write head and an airbearing slider where the airbearing slider carries the read/write head. Read/write head of the slider/head assembly 112 is positioned over the top surface of the spinning disk 110 on a given track for reading data stored on that track and for writing data onto the spinning disk surface.

The user data or customer data stored by DASD 100 is converted or modulated in a special way before it is written to the disk. Similarly, when information is read from the disk, it has to be demodulated in order for the data to be interpreted. The modulation method used for modern disk drive is a modified version of frequency modulation (FM). For example, simple frequency modulation (FM) is commonly used in radio and television. A frequency modulated signal will contain a continuously varying frequency, f, that is limited within a frequency band, i.e., $f_{min}<f<f_{max}$. Typically, $f_{max}$ is ten times to twenty times $f_{min}$.

DASD 100 includes an arm electronic (AE) module 114 that serves two functions, a read function and a write function. In the read function, AE module 114 amplifies and provides high-pass filtering for a continuous readback signal from the read/write head of the slider/head assembly 112. The output of the AE module 114 is sampled and digitized by a high speed analog-to-digital converter (ADC) 116 to produce a sample readback sequence x(n), where n is the sampling index. In FIG. 1, the ADC 116 is symbolized as a sampling switch. The sampled readback sequence x(n) is fed into a read or recording channel 118. In read channel 118, the sampled readback sequence x(n) is decoded and converted into a binary data stream used by host system under the handshaking control of a disk drive controller 122.

In the write function, AE module 114 provides a binary current modulated signal to a thin film write head element of read/write head 112 for writing data onto the spinning disk 110. Under the control of the disk drive controller 122, a write channel 120 encodes and frequency modulates the customer data. The customer data to be stored on the spinning disk 110 is received from the host system on line 124.

In accordance with features of the preferred embodiment, DASD 100 includes a high-flyer detection system 126. The sampled readback sequence x(n) is applied to a high-flyer detection system 126. Operation of the high-flyer detection system 126 is illustrated and described in the process flow diagram of FIG. 3.

As can be seen from FIG. 1, the high-flyer detection system 126 has two outputs. A first output at a line 128 is connected to the high frequency boost portion of an equalizer filter 129 of the recording channel 118. Another output at a line 130 is connected to the disk drive controller 122.

Figure 2:
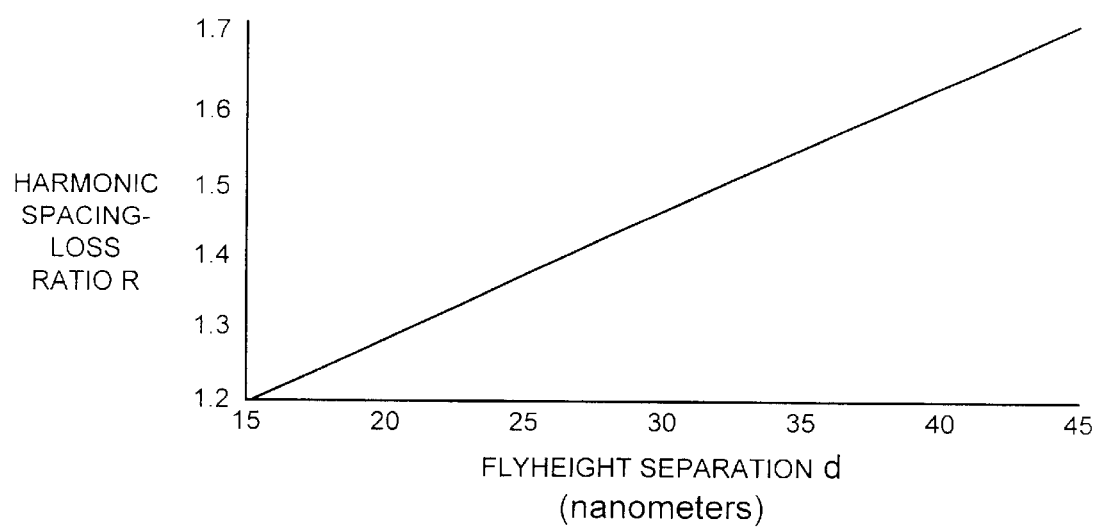
FIG. 2 is a chart illustrating a simulated normalized harmonic spacing loss ratio R with respect to the vertical axis with flyheight separation shown relative to the horizontal axis.

FIG. 2 illustrates a simulated ratio, R, of the normalized harmonic spacing loss for the first and third harmonic components for a disk drive at a track radius of 40 milimeters, a rotational spindle velocity of 15,000 revolutions/minute (RPM), a write-frequency of 60 MHz, and a nominal head-to-disk separation of 30 nanometers. As clearly shown in FIG. 2, the normalized harmonic ratio R increases for increasing flyheight separation d. This results because the spacing-loss or attenuation is larger for the higher third harmonic frequency component than for the first harmonic frequency component.

The high-flyer detection system 126 of the preferred embodiment provides in situ monitoring to detect a high flying slider/head assembly 112. A randomly located buildup of excessive lubricant on the surfaces of disks 110 occasionally occurs in DASD 100. This local excess of lubricant buildup causes the slider/head assembly 112 to fly higher when the lubricant is underneath the slider. The excess lubricant buildup does not have to be located on the track of interest to cause an increase in flyheight, since the center airbearing pad of the slider is much wider than a single track. Thus, a neighboring track with lubricant buildup may cause an increase in flyheight at the track of interest. The increased flyheight will cause an increased spacing loss while writing data to the disk or reading data from the disk. The increased spacing loss will cause excessive attenuation of the higher frequencies of the frequency modulated data. The increased attenuation of higher frequencies may lead to data errors in the read process and incorrectly record data during the write process resulting in loss of data.

Figure 3:
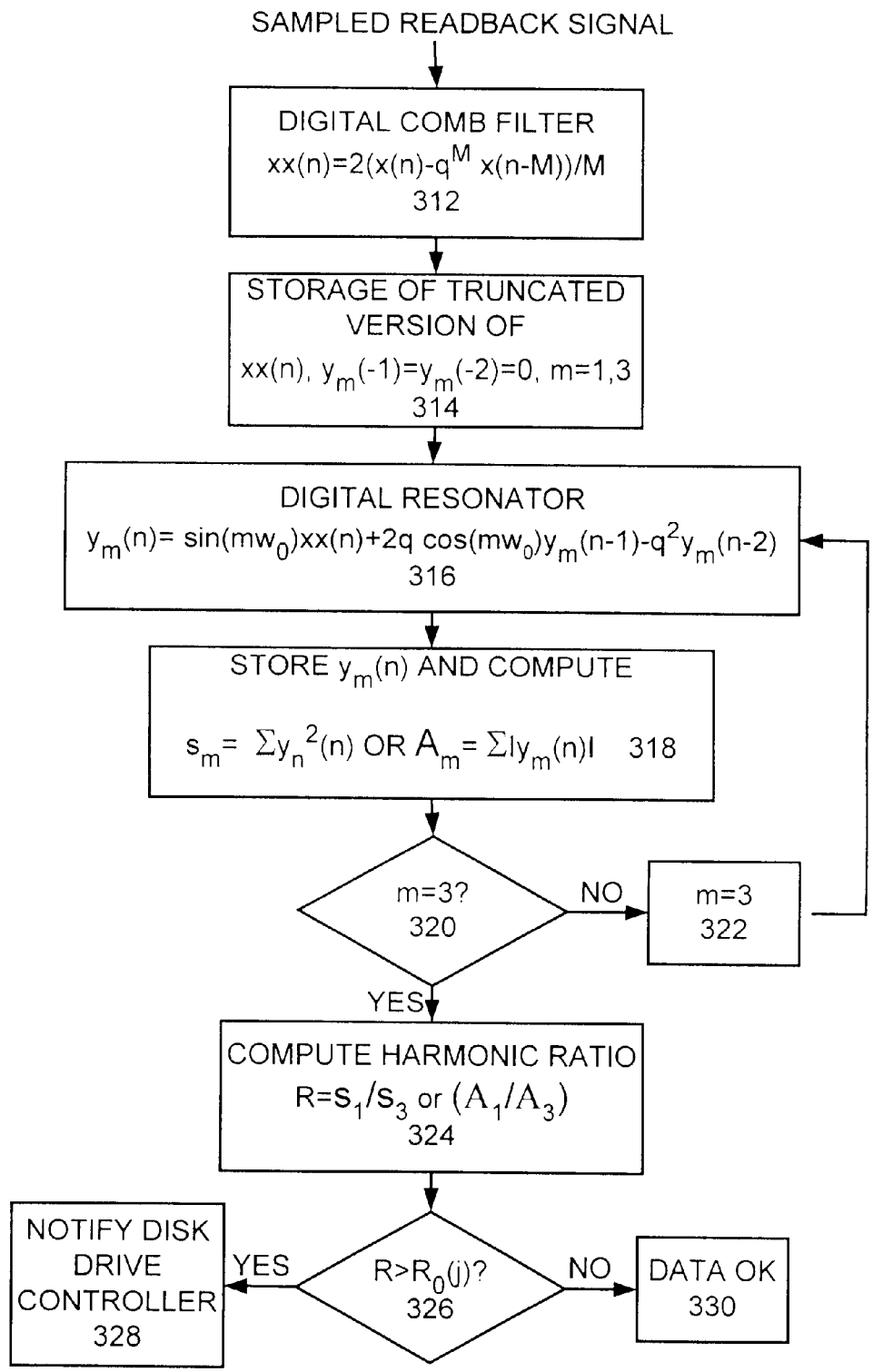
FIG. 3 is a flow chart illustrating exemplary sequential operations for in situ detection of high-flying sliders over customer data in accordance with the preferred embodiment.

Referring now to FIG. 3, exemplary sequential operations for in situ detection of high-flying sliders over customer data in accordance with the preferred embodiment are shown. In situ detection of high-flying sliders starts with the pre-filtered, sampled and digitized readback sequence x(n) including N samples from one logic block of customer data that is applied to a digital comb filter as indicated in a block 312. The sampling index is designated as n. The digital comb filter at block 312 has a generating algorithm as follows:

$$xx(n)=2(x(n)-(q^M)x(n-M))/M \quad \text{Equation (4)}$$

where M is an integer and is called a delay index. A scaling parameter q, which has a value close to but less unity, is required for stability purposes. The term x(n–M) implies that the sequence x(n) has been delayed by M sampling periods. Equation (4) shows that a delayed sequence x(n–M), multiplied by ($q^M$), has been subtracted from x(n) and that the result has been multiplied by the factor 2/M. The first M elements of the resulting output xx(n) have been removed from the sequence xx(n) before a resulting (N–M) element sequence is stored as indicated in a block 314.

A digital resonance frequency $w_o$ for a digital resonator as indicated in a block 316 is set to a fraction of the digital sampling frequency (2*π), for example, $w_o=\pi/4$. The value of $w_o$ is stored in block 314 which also initializes the output value $y_m(-2)=y_m(-1)=0$, m=1, 3, for the digital resonator at block 316. The digital resonator is a second-order infinite impulse response (IIR) filter in a cascade combination with the digital comb filter at block 312. The filter algorithm for the digital resonator at block 316 is given by:

$$y_m(n)=\sin(m\,w0)xx(n)+2q\cos(m\,w0)y_m(n-1)-q^2 y_m(n-2) \quad \text{Eq. (5)}$$

where the integer m=1, 3, is the harmonic index. The cascade combination of the digital comb filter 312 and the digital resonator 316 works as a pencil sharp bandpass filter. The derivation for this filter can be found digital signal processing II lecture notes, lecture 2.30, "Application of Frequency Sampling Filters," by Hal H. Ottesen, Ph. D., Tutorial Technology, Inc., Rochester Minn. 55901.

Figure 4A:
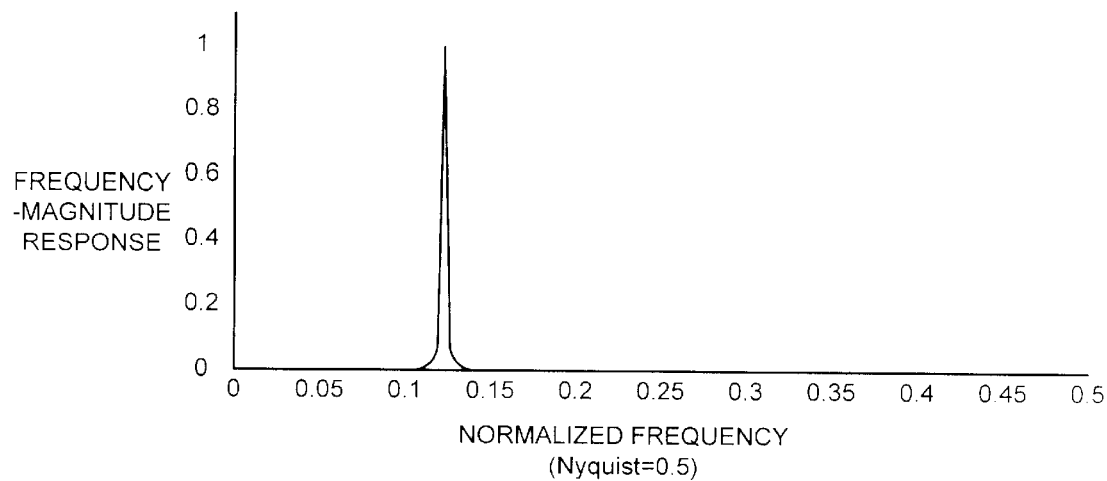
FIGS. 4A and 4B are charts respectively illustrating frequency magnitude response with respect to the vertical axis versus a normalized frequency fn shown relative to the horizontal axis for a bandpass filter centered at fn=0.125 and a third harmonic bandpass filter centered at fn=0.375.
Figure 4B:
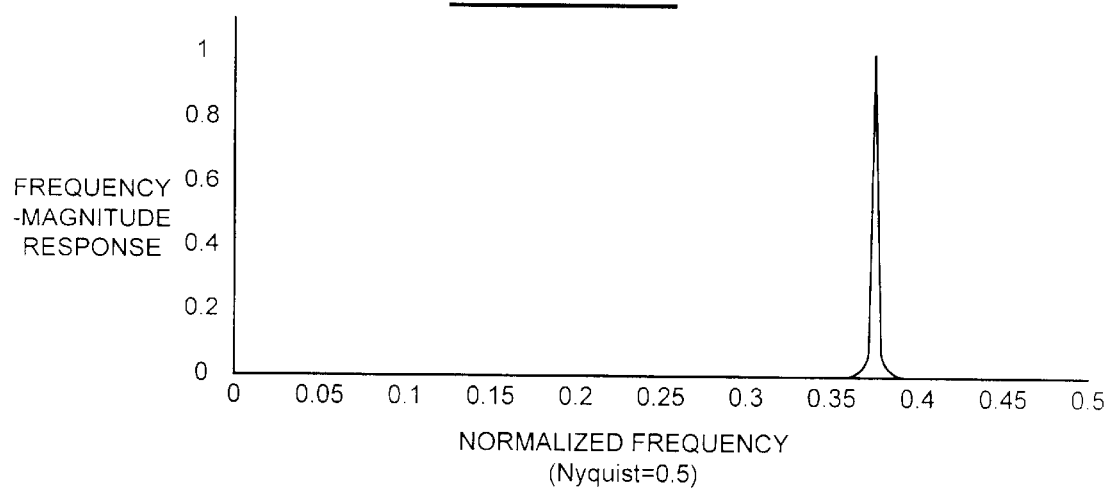

Referring also to FIGS. 4A and 4B, frequency magnitude response versus a normalized frequency $f_n$ for a bandpass filter centered at $f_n=0.125$ and a third harmonic bandpass filter centered at $f_n=0.375$ are respectively illustrated. As an example, the frequency magnitude response versus the normalized frequency ($f_n$) of the pencil sharp bandpass filters as digital resonance frequency $w_1=w_o=\pi/4$ and third harmonic resonance frequency $w_3=3w_o=3\pi/4$ have been shown in FIGS. 4A and 4B. The parameter values for these filters were M=300 and q=0.999. For an actual operation the delay index M should be a multiple of the number of samples per period of the first harmonic, for example, a multiple of 8, since the first harmonic has eight samples per period. A remarkable property of these pencil-sharp bandpass filters is that the sharpness increases for increasing values of M. Furthermore, the processed output sample $y_m(n)$ only requires 3–4 real multiplications and four additions or subtractions, and the computation time is independent of the delay index M. Thus, the overall algorithm is extremely fast and can therefore operate in real time, for example, using an available servo processor (not shown) in DASD 100.

Referring again to FIG. 3, the effectively bandpass filtered output $y_1(n)$, (m=1) of the digital resonator at block 316 is processed first. In a next block 318, the output $y_1(n)$ is either squared or the absolute value is taken and then accumulatively summed in S1 for the (N–M) samples. A decision block 320 checks whether the harmonic index m is equal to 3. If not, m is set equal to three as indicated in a block 322, and the digital resonator 316 processes the comb filtered data xx(n) that was stored in block 314. Then, the output $y_3(n)$ is either squared or the absolute value is taken and then accumulatively summed in S3 for the (N–M) samples in block 318. Then the harmonic ratio R=S1/S3 is computed as indicated in a block 324 or to compute R=A1/A3, if the absolute value of $y_m(n)$ is used. For the sum of the squared values, Si, i=1, 3, is approximately equal to the variance. The variance ratio R is the preferred choice.

If the ratio R is greater than $R_0(j)$ for the j-th head as indicated in a decision block 326, then the disk drive controller 122 is notified as indicated in a block 328, that the j-th head is temporarily flying above desired head-to-disk separation. Otherwise, if R is less than $R_0(j)$, then the head-to-disk separation is adequate and the data recorded integrity is OK as indicated in a block 330. The value of the threshold $R_0(j)$ is a function of the particular MR head and disk magnetic surface parameters for head/disk-surface (j). It is also a function of the nominal head-to-disk separation. The value of $R_0(j)$ is determined statistically by monitoring successful read operations for the MR head (j). If the threshold $R_0(j)$ is a function of track radius r, then $R_0(j, r)$ is used as a threshold. Then, the statistics of $R_0(j, r)$ are computed over bands of tracks that sections the recording surface (j).

Referring to FIGS. 5A and 5B examples of two different arrangements of logical data block (LDB) sectors and servo sectors S for an outer diameter (OD) track and for an inner diameter (ID) track are respectively illustrated. Servo sectors S contain servo information used to position the data heads 112 in registration with the customer data. The customer data sector of interest is designated as LDB(k). Customer data is usually segmented into logical data blocks (LDB) of, for example, 512 byte blocks. At the outer track radius (40 mm) there can be as many as four LDBs between servo sectors, S. The physical length of an LDB along a track is roughly 0.025 inch or 0.64 mm. Sometimes the localized area of an excessive buildup of lubricant can have a diameter much larger than the physical LDB. FIG. 5A illustrates four LDBs for a given head (j) and a given track (t) between two servo sectors at the outer diameter (OD) of the disk surface. The LDB sector index is designated at the integer k. In the FIGS. 5A and 5B, the track is moving from the right to the left. FIG. 5B depicts a LDB layout of an inner diameter (ID) track, where one LDB, labeled L, is split in two parts by a servo sector S.

Figure 6:
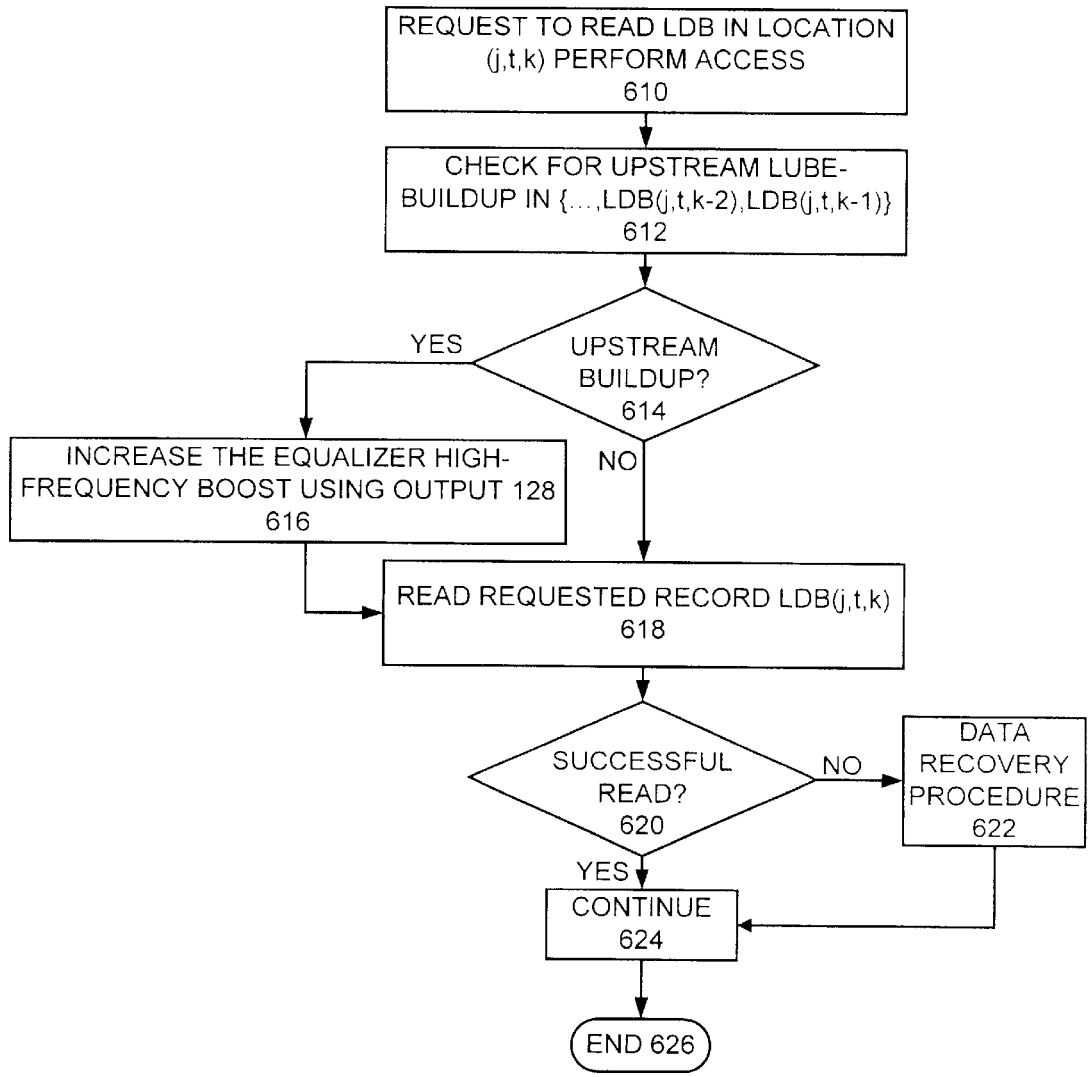
FIG. 6 is a flow chart illustrating exemplary sequential steps for reading a stored logical data block with the in situ detection of high-flying sliders over customer data in accordance with the preferred embodiment.
Figure 7:
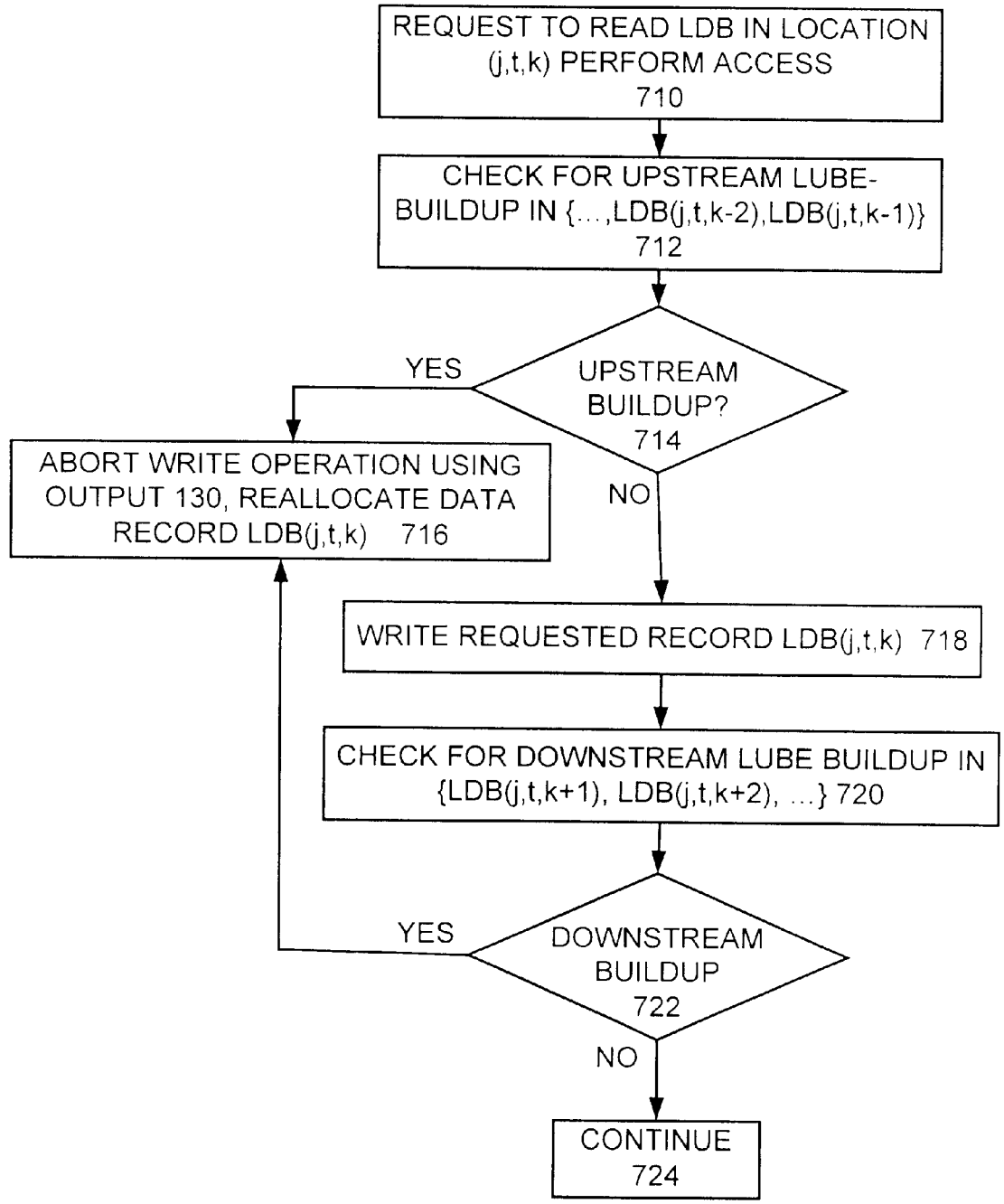
FIG. 7 is a flow chart illustrating exemplary sequential steps for writing a stored logical data block with the in situ detection of high-flying sliders over customer data in accordance with the preferred embodiment.

Having reference to the process flow diagram of FIG. 3 and the disk drive system 100 of FIG. 1, operation of the preferred embodiment may be understood as shown in FIGS. 6 and 7. The two situations to be addressed, are the reading of a stored LDB as illustrated and described with respect to FIG. 6 and the writing of a new LDB as illustrated and described with respect to FIG. 7.

Referring now to FIG. 6, an exemplary process flow diagram is shown for reading of a stored logical data block (LDB). First the disk drive 100 locates a given head (j) and track (t) at a particular logic sector (k) for a subsequent reading of the stored data block LDB(j, t, k) as indicated in a block 610. Disk drive 100 reads several upstream LDBs as indicated in a block 612, i.e., LDG (j, t, k–2), LDB(j, t, k–1) and determines if any lubricant buildup exists as indicated in a decision block 614. If the answer is yes, then a high frequency boost is provided in the equalizer filter located in the recording channel 118 via the output line 128 of FIG. 1. The boost of the high frequency gain compensates for the high frequency spacing loss in the readback signal that is caused by the increased flyheight. In this way, the desired LDB(j, t, k) is read more reliably. Then the desired block LDB(j,t,k) is read as indicated in a block 618. If the answer is no, then the sequential steps proceed directly to reading the logical data block LDB(j, t, k) as indicated in a block 618. The success of the read operation is monitored as indicated in a decision block 620. If the read is successful then the normal operation continues as indicated in a block 624. If the read operation is not successful, then the disk drive controller 122 enters into a data recovery procedure (DRP) as indicated in a block 622 with the knowledge that there exists any excessive lubricant buildup. If no lubricant buildup was detected, but a data error was present, then the DRP operation in block 622 is processed as usual.

Referring now to FIG. 7, an exemplary process flow diagram is shown for writing of a new logical data block (LDB). This process is more difficult, because the nature of any lubricant buildup in the neighborhood of the desired location of LDB(j, t, k) can only be predicted based on upstream information. The disk drive 100 reads several upstream LDBs as indicated in a block 712, that is, { . . . LDB(j, t, k−2), LDB(j, t, k−1)} and determines if lubricant buildup exists as indicated in a decision block 714. If the an indication of any lubricant buildup for the nearest upstread LDBs is identified, { . . . LDB(j, t, k−2), LDB(j, t, k−1)}, then the write operation will be aborted as indicated in a block 716, and the new LDB to be written is relocated to another assigned portion of the disk 110. If there is no indication of lubricant buildup in the neighboring upstream LDBs, then the LDB(j, t, k) is written as shown in a block 718. To make sure that the location (j, t, k) is free for lubricant buildup, lubricant buildup calculations are preformed for a few of the downstream LDBs are performed as indicated in a block 720. As indicated in a decision block 722, checking is performed to determine whether an indication of any excessive lubricant buildup is detected in one of the neighboring downstream LDBs, i.e., {LDB(j, t, k+1), LDB(j, t, k+2), . . . }. If the answer is yes, then the write operation is also aborted through block 716, and the new LDB is relocated to another assigned portion of the disk. Only when both the upstream and downstream neighboring LDBs have a negative indication of any excessive buildup will the new LDB be stored in the desired location.

Actual data from obtained from a modern disk drive that had data error problems with a high flying head at a particular location on an OD track has been used. Readback data from four consecutive LDBs was sampled and digitized as a sampling frequency of 500 MHz and filtered through the digital comb/resonator filter at a first frequency of 62.5 MHz and at a second frequency of 187.5 MHz. The number of samples per LDB was 9,000 samples. The delay index M was set equal to 128, that is a multiple of eight. The number of samples in the truncated filter output y(n) was 9,000−128=2, 872 samples. In this application the digital comb/resonator filter was derived on the premise that the fundamental frequency had eight samples per period. It was determined from the actual data that the excessive lubricant buildup was migrating slowly outward across the disk surface. This implies that the lubricant buildup problem at one given track (t) at a particular surface (j) will only be temporary. This was verified at a later time when the data was rewritten and recovered or read successfully in the previous problem location. Table 1 shows the computed variance ratio R for the four LDBs for the earlier problem data, R(bad) and the later good data R(good).

TABLE 1

Computed Variance Ratio R for Bad Data and Good Data

| LDB Number | R (bad) | R (good) |
|---|---|---|
| 1 | 355 | 326 |
| 2 | 433 | 332 |
| 3 | 362 | 318 |
| 4 | 396 | 351 |

Referring to Table 1, the average difference between R (bad) column and the R (good) column is more than 14%. If a threshold $R_0(j)=380$ was used, then logical data blocks (LDBs) 2 and 4 would indicate an excessive buildup. Thus, no LDB writing would be performed in the flawed neighborhood. Expecially, LDB block 2 shows a difference in the variance ratio R of more than 100 or 25%, which illustrates that the high-flyer detection system 126 of the preferred embodiment provides a good signal-to-noise ratio (SNR) for detection.

The use of the variance ratio R makes the detection of excessive lubricant buildup independent of the amplitude of the readback signal. This makes the method very robust and this is an important advantage in its application. Writing customer data will produce bipolar, variable length written magnetic fields on the track, the corresponding transitions in the readback signal are rich in high frequency components. The use of one eight of the sampling frequency as the first harmonic is a good first choice. The use of odd harmonics for the variance ratio R accentuates the natural symmetry of the readback signal.

Figure 8:
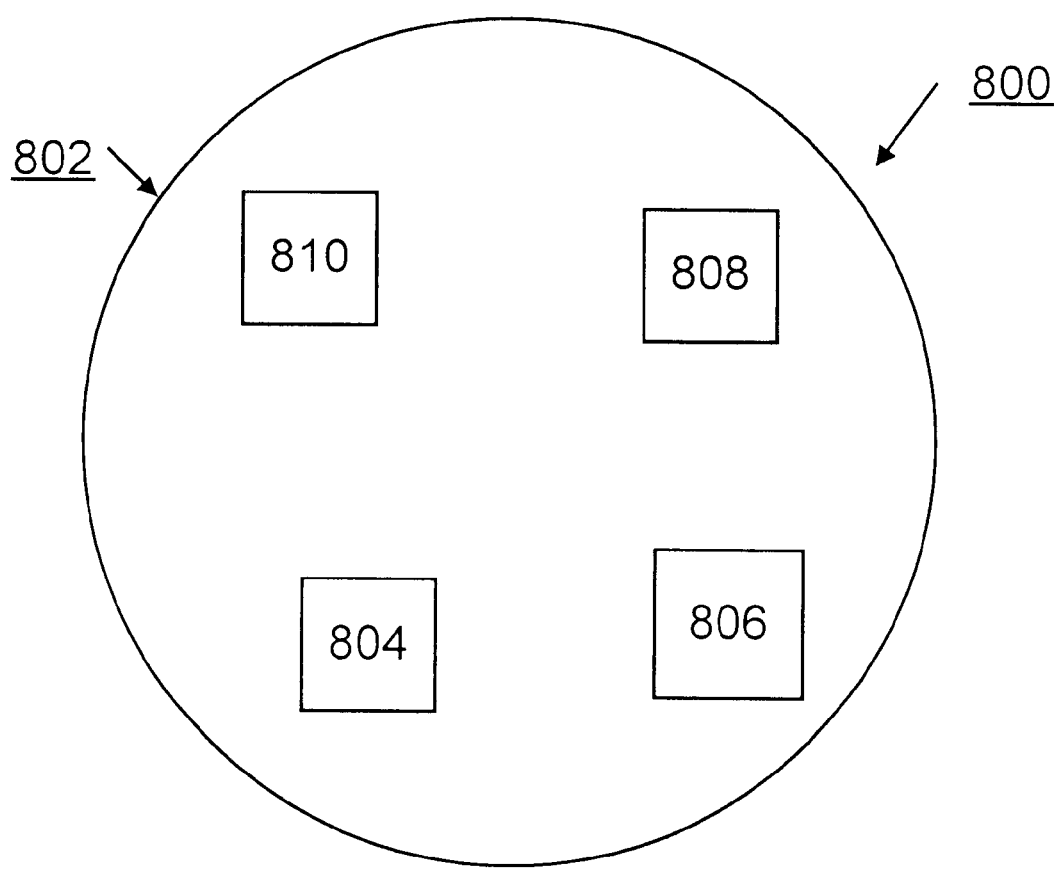
FIG. 8 is a block diagram illustrating a computer program product in accordance with the preferred embodiment.

Referring now to FIG. 8, an article of manufacture or a computer program product 800 of the invention is illustrated. The computer program product 800 includes a recording medium 802, such as, a floppy disk, a high capacity read only memory in the form of an optically read compact disk or CD-ROM, a tape, a transmission type media such as a digital or analog communications link, or a similar computer program product. Recording medium 802 stores program means 804, 806, 808, 810 on the medium 802 for carrying out the methods for in situ detection of high-flying sliders over customer data of the preferred embodiment in the DASD 100 of FIG. 1.

A sequence of program instructions or a logical assembly of one or more interrelated modules defined by the recorded program means 804, 806, 808, 810, direct the DASD 100 for carrying out the methods for in situ detection of high-flying sliders over customer data of the preferred embodiment.

While the present invention has been described with reference to the details of the embodiments of the invention shown in the drawing, these details are not intended to limit the scope of the invention as claimed in the appended claims.

What is claimed is:

1. A method for in situ detection of high-flying sliders over customer data in a direct access storage device comprising the steps of:

receiving a sampled and digitized readback sequence x(n) from a logical data block of customer data;

generating bandpass filtered customer data of said readback sequence x(n) from said logical data block of customer data;

processing said generated bandpass filtered customer data and generating a predefined harmonic ratio; and comparing said generated predefined harmonic ratio with a predefined threshold value to identify a high-flying slider.

2. A method for in situ detection of high-flying sliders over customer data in a direct access storage device as recited in claim 1 wherein the step of processing said generated bandpass filtered customer data and generating said predefined harmonic ratio includes the steps of storing said generated bandpass filtered customer data for a predefined number of samples; squaring said bandpass filtered customer data for each of said predefined number of samples and accumulatively summing said squared bandpass filtered customer data for said predefined number of samples; and generating said predefined harmonic ratio utilizing said summed bandpass filtered customer data.

3. A method for in situ detection of high-flying sliders over customer data in a direct access storage device comprising the step of:
receiving a sampled and digitized readback sequence x(n) from a logical data block of customer data;
generating bandpass filtered data of said readback sequence x(n);
processing said generated bandpass filtered data and generating a predefined harmonic ratio including the steps of storing said generated bandpass filtered data for a predefined number of samples; taking an absolute value of said bandpass filtered data for each of said predefined number of samples and accumulatively summing said absolute value bandpass filtered data for said predefined number of samples; and generating said predefined harmonic ratio utilizing said absolute value bandpass filtered data; and
comparing said generated predefined harmonic ratio with a predefined threshold value to identify a high-flying slider.

4. A method for in situ detection of high-flying sliders over customer data in a direct access storage device as recited in claim 3 wherein the step of receiving said sampled and digitized readback sequence x(n) from said logical data block of customer data includes the steps of receiving said sampled and digitized readback sequence x(n) including N samples.

5. A method for in situ detection of high-flying sliders over customer data in a direct access storage device as recited in claim 3 wherein the step of generating bandpass filtered data of said readback sequence x(n) includes the steps of applying said sampled and digitized readback sequence x(n) including N samples to a digital comb filter having a predefined generating algorithm and storing a predefined resulting sequence.

6. A method for in situ detection of high-flying sliders over customer data in a direct access storage device as recited in claim 5 further includes the steps of applying said predefined resulting sequence to a digital resonator.

7. A method for in situ detection of high-flying sliders over customer data in a direct access storage device as recited in claim 3 wherein the step of comparing said generated predefined harmonic ratio with said predefined threshold value to identify the high-flying slider includes the steps of comparing said generated predefined harmonic ratio with a predefined threshold value determined as a function of predefined transducer head and disk surface values.

8. A method for in situ detection of high-flying sliders over customer data in a direct access storage device as recited in claim 7 wherein predefined threshold values are determined statistically by monitoring successful read operations of a predefined transducer head.

9. A method for in situ detection of high-flying sliders over customer data in a direct access storage device as recited in claim 3 includes the steps of identifying a write request to a selected write location; receiving and processing said sampled and digitized readback sequence x(n) from said logical data block of customer data both upstream and downstream of said selected write location to identify said high-flying slider; and aborting said write operation responsive to identifying said high-flying slider.

10. A method for in situ detection of high-flying sliders over customer data in a direct access storage device comprising the steps of:
receiving a sampled and digitized readback sequence x(n) from a logical data block of customer data;
generating bandpass filtered data of said readback sequence x(n);
processing said generated bandpass filtered data and generating said predefined harmonic ratio including the steps of storing said generated bandpass filtered data for a predefined number of samples equal to N–M, where N equals a number of samples of said received sampled and digitized readback sequence x(n) and M is a delay index, integer value; and
comparing said generated predefined harmonic ratio with a predefined threshold value to identify a high-flying slider.

11. A method for in situ detection of high-flying sliders over customer data in a direct access storage device as recited in claim 10 includes the steps of identifying a read request to a selected read location; receiving and processing said sampled and digitized readback sequence x(n) from said logical data block of customer data upstream of said selected read location to identify said high-flying slider; providing an increased equalizer high frequency boost to a read channel responsive to identifying said high-flying slider; and performing said read request.

12. Apparatus for in situ detection of high-flying sliders over customer data in a direct access storage device comprising:
a sampled and digitized readback sequence x(n) from a logical data block of customer data;
a bandpass filter receiving said sampled and digitized readback sequence x(n) from said logical data block of customer data and generating bandpass filtered data of said readback sequence x(n); bandpass filter including a digital comb filter and a digital resonator;
a harmonic ratio generator coupled to said bandpass filter and processing said generated bandpass filtered data and generating a predefined harmonic ratio;
a comparator comparing said generated predefined harmonic ratio with a predefined threshold value to identify a high-flying slider; and
said digital comb filter has a predefined generating algorithm represented by $$xx(n)=2(x(n)-(q^M)x(n-M))/M$$

where M is a delay index integer value and q is a predefined scaling parameter.

13. Apparatus for in situ detection of high-flying sliders over customer data in a direct access storage device comprising:
a sampled and digitized readback sequence x(n) from a logical data block of customer data;
a bandpass filter receiving said sampled and digitized readback sequence x(n) from said logical data block of customer data and generating bandpass filtered data of said readback sequence x(n);
a harmonic ratio generator coupled to said bandpass filter and processing said generated bandpass filtered data and generating a predefined harmonic ratio; said harmonic ratio generator stores said generated bandpass filtered data for said predefined number of samples equal to N−M, where N equals a number of samples of said received sampled and digitized readback sequence x(n) and M is a delay index, integer value; and a comparator comparing said generated predefined harmonic ratio with a predefined threshold value to identify a high-flying slider.

14. Apparatus for in situ detection of high-flying sliders over customer data in a direct access storage device as recited in claim 13 includes an analog-to-digital converter receiving a readback signal and producing said sampled and digitized readback sequence x(n) from said logical data block of customer data.

15. Apparatus for in situ detection of high-flying sliders over customer data in a direct access storage device as recited in claim 13 wherein said bandpass filter receiving said sampled and digitized readback sequence x(n) from said logical data block of customer data and generating bandpass filtered data of said readback sequence x(n) includes a digital comb filter and a digital resonator.

16. Apparatus for in situ detection of high-flying sliders over customer data in a direct access storage device as recited in claim 15 wherein said digital resonator includes a second-order infinite impulse response filter.

17. Apparatus for in situ detection of high-flying sliders over customer data in a direct access storage device as recited in claim 13 wherein said harmonic ratio generator squares said bandpass filtered data for each of said predefined number of samples and accumulatively sums said squared bandpass filtered data for said predefined number of samples; and generates said predefined harmonic ratio utilizing said summed bandpass filtered data.

18. Apparatus for in situ detection of high-flying sliders over customer data in a direct access storage device as recited in claim 13 wherein said harmonic ratio generator takes an absolute value of said bandpass filtered data for each of said predefined number of samples and accumulatively sums said absolute value bandpass filtered data for said predefined number of samples; and generating said predefined harmonic ratio utilizing said absolute value bandpass filtered data.

19. Apparatus for in situ detection of high-flying sliders over customer data in a direct access storage device as recited in claim 13 wherein said predefined threshold value is determined as a function of predefined transducer head and disk surface values.

* * * * *